United States Patent [19]

Uchida et al.

[11] Patent Number: 4,862,985
[45] Date of Patent: Sep. 5, 1989

[54] VARIABLE ASSIST POWER STEERING SYSTEM WITH VARYING POWER ASSIST WITH VEHICLE SPEED

[75] Inventors: Koh Uchida, Sagamihara; Takashi Kurihara, Atsugi; Makoto Miyoshi, Kawasaki; Hirohide Kai, Fujisawa, all of Japan

[73] Assignee: Nissan Motor Co., Ltd., Yokohama, Japan

[21] Appl. No.: 138,402

[22] Filed: Dec. 28, 1987

[30] Foreign Application Priority Data

Dec. 27, 1987 [JP] Japan .............................. 61-313520

[51] Int. Cl.$^4$ .............................................. B62D 5/06
[52] U.S. Cl. ..................................... 180/141; 180/142
[58] Field of Search ............. 180/141, 142, 143, 132, 180/146, 149

[56] References Cited

U.S. PATENT DOCUMENTS

| | | | |
|---|---|---|---|
| 4,465,098 | 8/1984 | Bacardit | 137/625.21 |
| 4,512,238 | 4/1985 | Bacardit | 91/370 |
| 4,561,516 | 12/1985 | Bishop et al. | 180/142 |
| 4,561,521 | 12/1985 | Duffy | 180/142 |
| 4,565,115 | 1/1986 | Bacardit | 91/375 |
| 4,570,735 | 2/1986 | Duffy | 180/142 |
| 4,594,936 | 6/1986 | Bacardit | 91/51 |
| 4,619,339 | 10/1986 | Futaba et al. | 180/143 |
| 4,632,204 | 12/1986 | Honaga et al. | 180/142 |
| 4,669,568 | 6/1987 | Kervagoret | 180/142 |
| 4,672,885 | 6/1987 | Kervagoret | 91/450 |

FOREIGN PATENT DOCUMENTS

| | | | |
|---|---|---|---|
| 0041887 | 12/1981 | European Pat. Off. | |
| 53560 | 6/1982 | European Pat. Off. | 180/132 |
| 0072731 | 2/1983 | | |
| 0145546 | 6/1985 | European Pat. Off. | |
| 2568843 | 2/1986 | France | |
| 47-30039 | 11/1972 | Japan | |
| 54-15232 | 2/1979 | Japan | |
| 56-38430 | 9/1981 | Japan | |
| 56-174363 | 12/1981 | Japan | |
| 57-30663 | 2/1982 | Japan | |
| 58-156459 | 9/1983 | Japan | |
| 161667 | 9/1983 | Japan | 180/142 |
| 1073 | 1/1985 | Japan | 180/142 |
| 61-43229 | 9/1986 | Japan | |
| 0257365 | 11/1986 | Japan | 180/141 |
| 61-275062 | 12/1986 | Japan | |

Primary Examiner—Kenneth R. Rice
Attorney, Agent, or Firm—Foley & Lardner, Schwartz, Jeffery, Schwaab, Mack, Blumenthal & Evans

[57] ABSTRACT

A control valve includes valve elements relatively displaceable in response to a steering torque to define therebetween two parallel fluid flow paths connected between a fluid source and a fluid reservoir to produce pressure difference in a power cylinder. The control valve comprises a bypass path including a first externally controlled variable flow orifice and a variable flow orifice variable with steering torque and a first externally controlled variable flow orifice valve which are connected in series, a second externally controlled variable flow orifice valve, and a second variable flow orifice variable with steering torque. The bypass path is arranged in parallel with a portion of the two parallel fluid paths, the second externally controlled variable flow orifice valve is arranged in parallel with another portion of the parallel fluid paths, and the second variable flow orifice is arranged in series in the remaining portion of the parallel fluid paths.

13 Claims, 11 Drawing Sheets

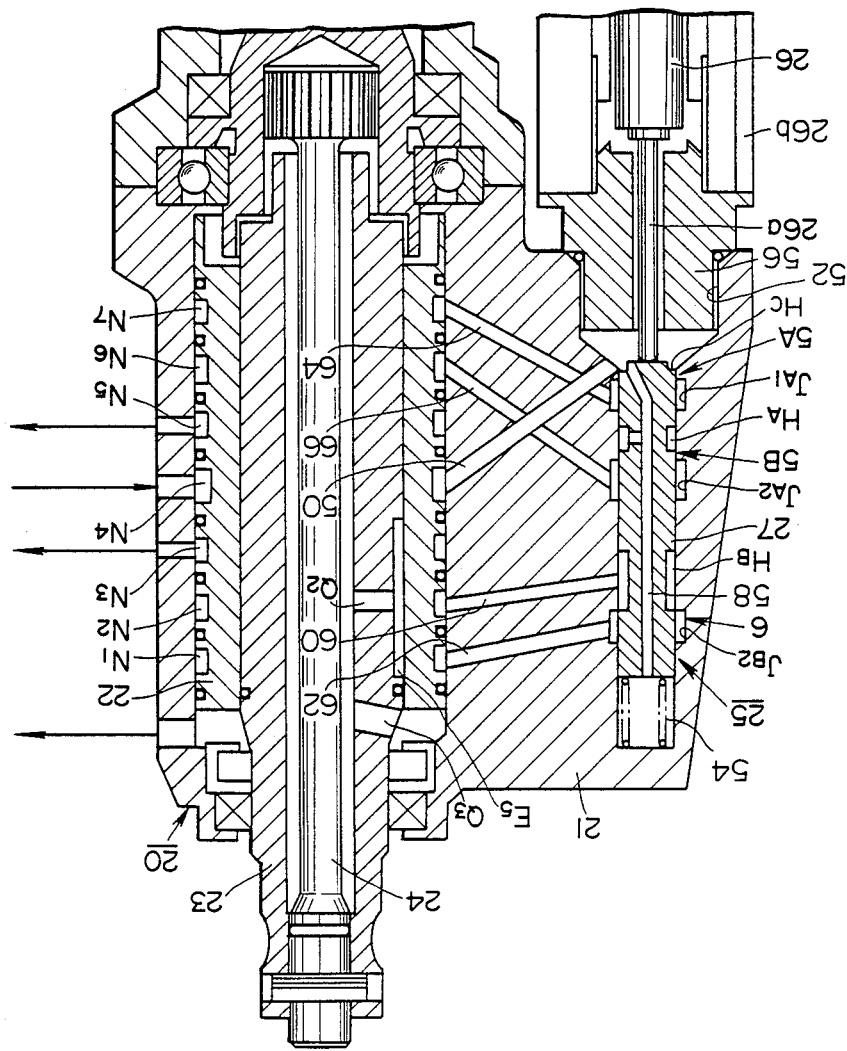

VARIABLE ASSIST POWER STEERING SYSTEM WITH VARYING POWER ASSIST WITH VEHICLE SPEED

RELATED APPLICATIONS

The following two U.S. Patent Applications have been already filed and assigned to the same assignee of the present application.
(1) U.S. Pat. Application Ser. No. 044,065, filed on Apr. 29, 1987, now pending.
(2) U.S. Pat. Application Ser. No. 102,412, filed on Sept. 29, 1987, now pending.

The following four U.S. Patent Applications have been concurrently filed and assigned to the same assignee of the present application.
(3) U.S. Pat. Application Ser. No. 138,345, filed on Dec. 28, 1987, claiming priority based on Japanese Patent Application No. 61-313517 with a filing date of Dec. 27, 1986
(4) U.S. Pat. Application Ser. No. 138,490, filed on Dec. 28, 1987, claiming priority based on Japanese Patent Application No. 61-313521 with a filing date of Dec. 27, 1986.
(5) U.S. Pat. Application Ser. No. 138,480, filed on Dec. 28, 1987, claiming priority based on Japanese Patent Application No. 61-313519 with a filing date of Dec. 27, 1986.
(6) U.S. Pat. Application Ser. No. 138,479, filed on Dec. 28, 1987, claiming priority based on Japanese Patent Application No. 61-313518 with a filing date of Dec. 27, 1986.

BACKGROUND OF THE INVENTION

The present invention relates to a variable assist power steering system for vehicles and more particularly to a hydraulic control valve for use in a variable assist power steering system where it is desirable to have the degree of power assistance change with vehicle speed or some other variable related to the mode of operation of the vehicle.

A power assisted steering system can be characterized as operating under three driving conditions. Firstly during straight ahead driving at medium to high speeds, the power requirements on the steering system are extremely low and the degree of power assistance provided by the steering gear should be correspondingly minimized to permit the feedback of road "feel" from the tires to the driver. Secondary during medium and high speed passing and cornering maneouvres, a progressive increase in the level of power assistance with driver input torque is desirable. Nevertheless moderate driver input torques should still be maintained in order that the driver can feel adequately the dynamic state of the vehicle. Thirdly, and lastly, during low speed or parking maneuvers, the power requirements on the steering system may be large and fidelity of the steering system in terms of transmitting road feel is of little importance. Under these circumstances it is generally desirable to offer large degrees of power assistance, thereby minimizing the input torque required to be furnished by the driver.

The demands for optimum valve characteristics during the above three driving conditions conflict. Attempts have been made in the past to avoid the conflicting demands of the first and third driving conditions, namely the need to achieve a low level assistance for high to medium speed on-center driving while having high levels of assistance for low speed and parking maneuvers, by exploiting the fact that, for most valves, the degree of assistance varies with the flow of oil. For example, in one such widely used system, the power steering pump is caused to reduce the flow of oil as vehicle speed increases. However, this adversely affects valve performance in the second driving condition above, namely medium to high speed passing and cornering maneuvers, where progressive valve response is impaired due to the low oil flow. Also, in the event that such a steering maneuvers requires rapid turning of the steering wheel, the lower pump flow may be inadequate, rendering the power assistance momentarily inoperative. In another known system disclosed in JP 56-38430 B2, a bypass path with a variable flow valve is connected between both ends of the power cylinder and the variable flow valve is controlled in response to vehicle speed to cause bypass flow to increase as vehicle speed increases. However, this adversely affects valve performance in the second driving condition above, namely medium to high speed passing and cornering maneuvers, where progressive valve response is impaired due to the low gain.

The most satisfactory method of matching valve performance in all three of the above-mentioned conditions is modulating the valve characteristic with vehicle speed. A system which provides for better modulation of power assistance with vehicle speed is disclosed in U.S. Pat. No. 4,561,521 and can be seen to employ a rotary valve with primary and secondary valve portions. A speed sensitive valve is used to control oil flow from the pump to the secondary valve portion so that at high vehicle speeds a parallel flow path is provided between the rotary valve and the pump as oil is distributed to both primary and secondary valve portions. At low vehicle speeds, the speed sensitive valve restricts the flow of oil from the pump to the secondary valve portion. During parking maneuvres, the primary valve portion acts alone in the normal manner and the secondary valve portion is vented and not fed with oil from the pump. A change from a high level of power assist to a low level of power assist, and conversely, is effected by a variable force solenoid which is used to establish a parallel flow path from the pump to the secondary valve portion through a variable flow orifice. A speed sensing module controls the solenoid to open and close a variable orifice valve thus providing gradual changes in the level of power assist as the vehicle speed changes. The rotary valve used in this power steering system includes a valve housing having a circular opening which receives a valve sleeve. Positioned within the valve sleeve is an inner valve. The inner valve is formed with a primary set of longitudinal grooves forming a primary valve section, and also with a secondary set of longitudinal grooves forming a secondary valve section. The primary and secondary sets of longitudinal grooves register with primary and secondary sets of internal grooves formed in the internal wall of the valve sleeve, respectively. The primary and secondary sets of internal grooves are difficult to machine and require skilled labour because they have to be formed in the cylindrical internal wall of the valve sleeve with high precision. This has caused increased production steps and manufacturing cost.

SUMMARY OF THE INVENTION

The object of the present invention is to improve a variable assist power steering system which is free from the problem above.

The specific object of the present invention is to provide a hydraulic fluid circuit for a variable assist power steering system which can be embodied with valve grooves easy to machine.

Another object of the present invention is to provide a hydraulic fluid circuit for a variable assist power steering system which has varying power assist characteristic with vehicle speed or some other variable related to mode of operation of the vehicle.

According to the present invention, both upstream and downstream portions of each of two parallel flow paths of a flow distributor circuit are modulated by externally controlled variable flow orifice valves.

In one form of the present invention, a plurality of variable flow orifices are provided in series in each of the two flow paths at the portion downstream of the ports connected to the power cylinder, and one of the plurality of variable flow orifices can be bypassed by an externally controlled variable flow orifice valve. The externally controlled variable flow orifice valve is opened to bypass the associated variable flow orifice as the vehicle speed or the variable related to mode of operation of the vehicle varies. Two bypass paths are arranged in parallel to variable flow orifices provided in the two flow paths at the upstream portions of the port connected to the power cylinder, each bypass path being provided with a variable flow orifice and an externally controlled variable flow orifice valve which are connected in series with each other. This externally controlled variable flow orifice valve is opened after the first-mentioned externally controlled variable orifice valve has been opened as the vehicle speed or the some other variable related to mode of operation of the vehicle increases.

In another form of the present invention, a plurality of variable flow orifices are provided in series in each of the two flow paths at the portion downstream of the ports connected to the power cylinder, and one of the plurality of variable flow orifices can be bypassed by an externally controlled variable flow orifice valve. The externally controlled variable flow orifice valve is opened to bypass the associated variable flow orifice as the vehicle speed or the variable related to mode of operation of the vehicle varies. A bypass path with two variable flow orifices and an externally controlled variable flow orifice valve is connected between both ends of the power cylinder. This externally controlled variable flow orifice valve is opened after the above-mentioned externally controlled variable flow orifice valve has been opened as the vehicle speed or the some other variable related to mode of operation of the vehicle increases.

BRIEF DESCRIPTION OF THE DRAWINGS

FIG. 3 is a longtudinal section of a rotary type control valve embodying a flow dirstirbutor circuit shown in FIG. 1;

DETAILED DESCRIPTION OF THE INVENTION

Figure 1:
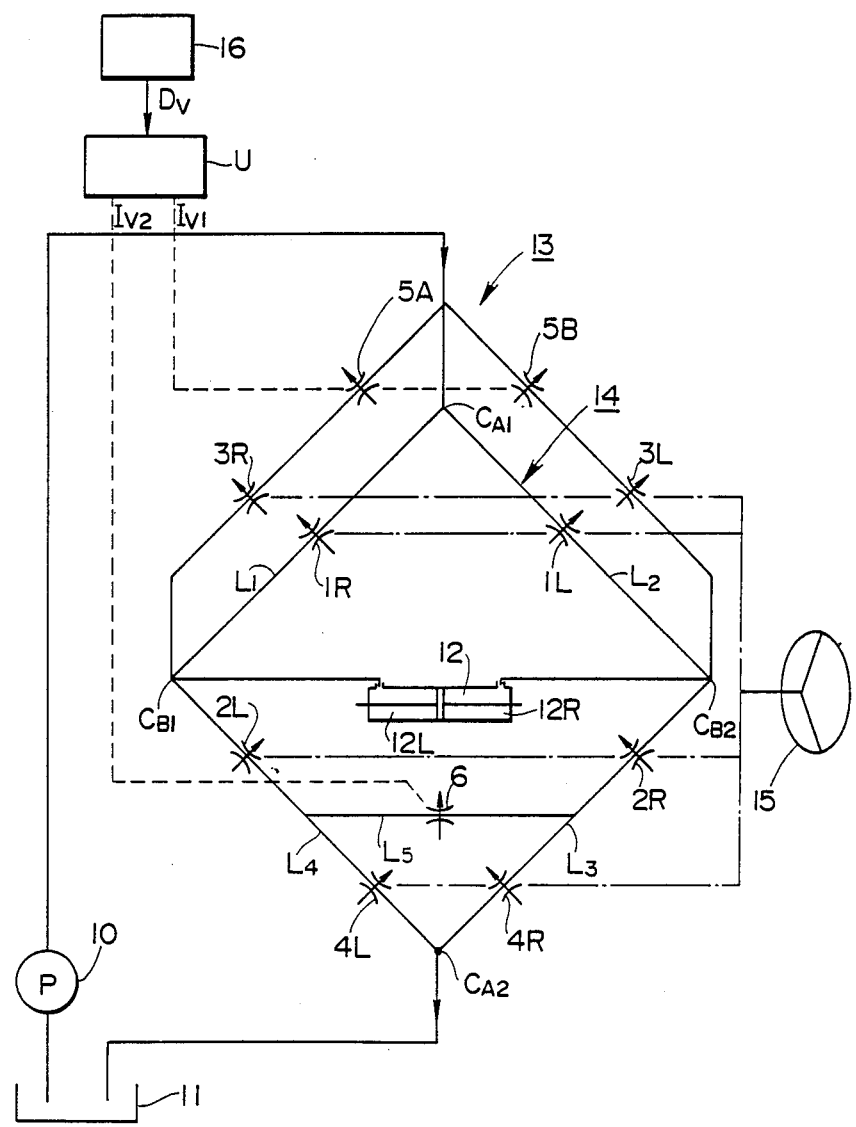
FIG. 1 is a circuit diagram showing a first embodiment.

FIG. 1 shows a hydraulic fluid circuit diagram which includes an oil pump 10 as a hydraulic fluid source, a tank 11 as a fluid reservoir, and a control valve 13 employing a fluid flow distributor circuit 14 of the open center type. Also shown are a steering wheel 15, a vehicle speed sensor 16, and a control unit U.

In the conventional manner, the fluid flow distributor circuit 14 includes two parallel flow paths $L_2$-$L_3$ and $L_1$-$L_4$ connected between a pump fluid supply port $C_{A1}$ and a fluid return port $C_{A2}$. The flow path $L_2$-$L_3$ has a cylinder connection port $C_{B2}$ connected to a cylinder chamber 12R of a power cylinder 12, while the other flow path $L_1$-$L_4$ has a cylinder connection port $C_{B1}$ connected to a cylinder chamber 12L of the power cylinder 12. Arranged in the upstream portion $L_2$ and the downstream portion $L_3$ of the flow path $L_2$-$L_3$ are two variable flow orifices 1R and 2L, respectively. Similarly, arranged in the unstream portion $L_1$ and the downstream portion $L_4$ of the other flow path $L_1$-$L_4$ are two variable flow orifices 1L and 2R, respectively. These variable flow orifices 1R, 2L, 1L and 2R are operatively associated with the steering wheel such that when the steering wheel 15 is in the central rest position, they are opened to provide unrestricted parallel flows of fluid between the fluid supply port $C_{A1}$ and the fluid return port $C_{A2}$. Turning the steering wheel 15 clockwise from the central rest position causes the variable flow orifices 1R and 2R to decrease their orifice areas as steering torque increases with the other two variable flow orifices 1L and 2L kept opened, and turning the steering wheel 15 counterclockwise from the central rest position causes the variable flow orifices 1L and 2L to decrease their orifice areas as steering torque increases with the other two variable flow orifices 1R and 2R kept opened.

In order to modulate the valve characteristics, both the upstream and downstream portions of each of the two parallel flow paths $L_2$-$L_3$ and $L_1$-$L_4$ has bypass flow paths, respectively. More specifically, arranged in poarallel to the variable flow orifice 1L is a bypass provided with a variable flow orifice 3L and an externally controled variable flow orifice valve 5B which are connected in series, and arranged in parallel to the variable flow orifice 1R is a bypas path provided with a variable flow orifice 3R and an externally controlled variable flow orifice valve 5A. For the downstream flow path portions $L_3$ and $L_4$, a variable flow orifice 4R is arranged in series with the variable flow orifice 2R and a variable flow orifice 4L is arranged in series with the variable flow orifice 2L, and a bypass path $L_5$ has one end connected to the fluid path $L_3$ between the variable flow orifices 2R and 4R and an opposite end connected to the fluid path $L_4$ between the variable flow orifices 2L and 4L. This bypass path $L_5$ is provided with an externally controlled vasriable flow orifice valve 6. The variable flow orifices 3R, 4R have orifice areas ($A_3$) and ($A_4$) which decrease as a steering torque (T) increases during a clockwise rotation of the steering wheel 15. The variable flow orifices 3L and 4L has orifice areas ($A_3$) and ($A_4$) which decrease as steering torque (T) increases during a counterclockwise rotation of the steering wheel 15. The externally controlled variable flow orifice valve 6 has an orifice area ($A_6$) variable in response to an electric current $I_{v2}$ generated by the control unit U in accordance with a detected vehicle speed signal $D_v$ from the vehicle speed sensor 16. The externally controlled variable flow orifice valves 5A and 5B have an orifice area ($A_5$) variable in response to an electric current $I_{v1}$ from the control unit U. As shown in FIGS. 2(e) and 2(f), the externally controlled variable flow orifices 5A and 5B are fully closed during low and medium vehicle speeds and fully opened at high vehicle speeds, while the externally controlled variable flow orifice valve 6 is closed at low vehicle speeds and fully opened at medium and high vehicle speeds.

Figure 2A:
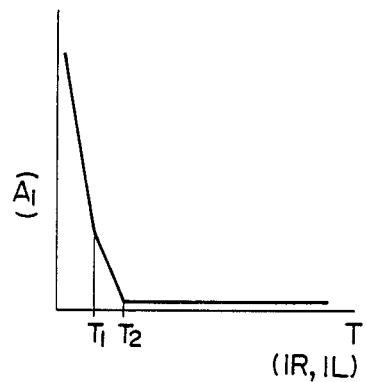
FIGS. 2(a) to 2(d) are diagrammatic charts showing how orifice areas of variable flow orifices vary against a steering input torque (T)
Figure 2B:
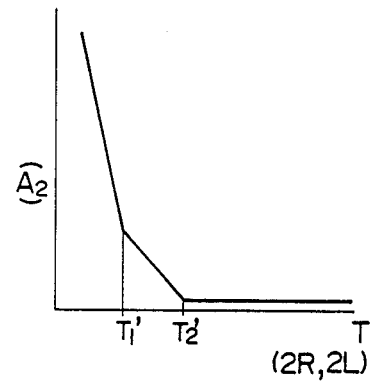
Figure 2C:
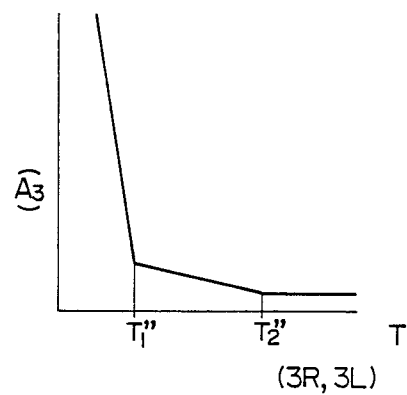
Figure 2D:
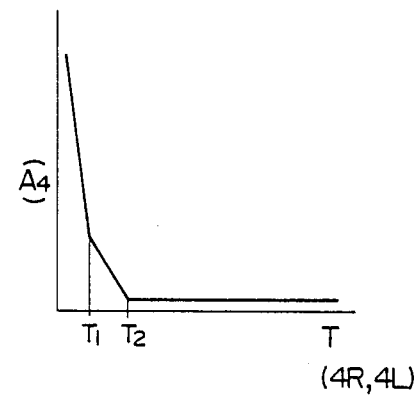
Figure 2E:
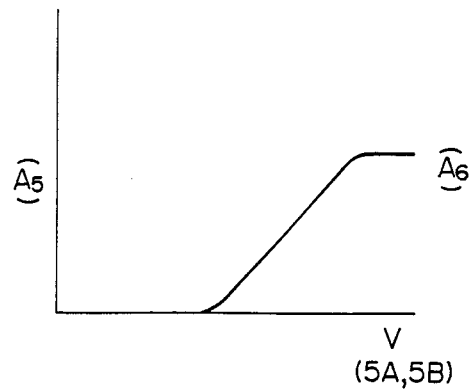
FIG. 2(e) to 2(g) are diagrammatic charts showing how orifice area of externally controlled variable flow orifice valves varies against vehicle speed (V)
Figure 2F:
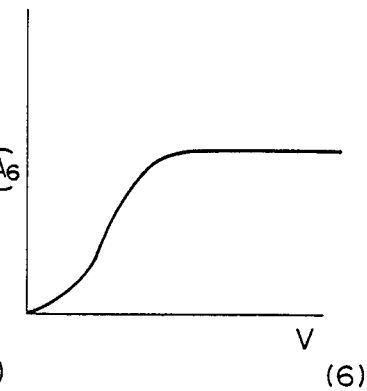

The settings of the various variable flow orifices 1R, 1L, 2R, 2L, 3R, 3L and 4R and 4L are explained referring to FIGS. 2(a), 2(b), 2(c) and 2(d). As will be readily understood from FIGS. 2(a), the variable flow orifices 1R and 1L are so selected as to provide a power assist large enough for operation at low vehicle speeds. As shown in FIG. 2(b), the variable flow orifices 2R and 2L are so selected as to provide a power assist suitable for operation at medium vehicle speeds. As shown in FIG. 2(c), the variable flow orifices 3R and 3L are so selected as to provide a power assist sufficiently low enough for operation at high vehicle speeds. As shown in FIG. 2(d), the variable flow orifices 4R and 4L show identical characteristics as those of the variable flow orifices 1R and 1L and thus provide a power assist large enough for operation at low vehicle speeds in series with the variable flow orifice 2L. Further, a bypass path $L_5$ has one end connected to the fluid flow path downstream portion $L_3$ at an intermediate point between the variable flow orifices 2R and 4R and an opposite end connected to the downstream portion $L_4$ at an intermediate point between said variable flow orifices 2L and 4L. Furthermore, a pair of bypass paths are arranged in parallel to the variable flow orifice.

Figure 5:
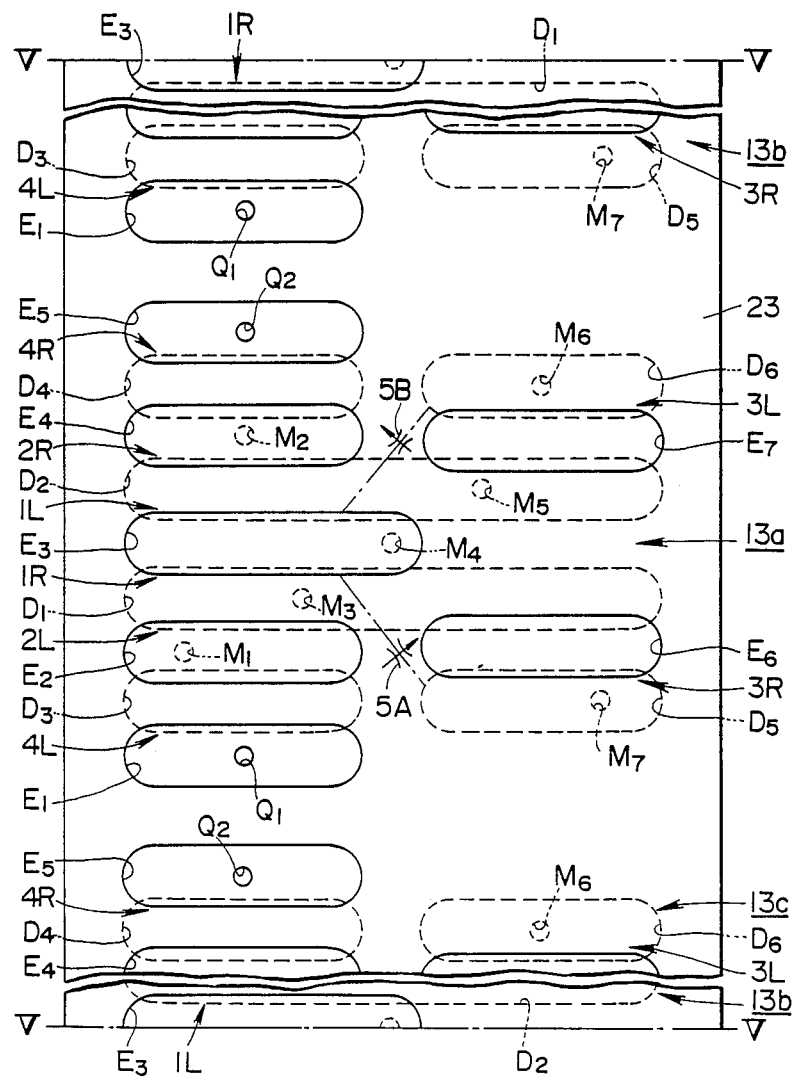
FIG. 5 is a diagram developed according to a longitudinal section along the line V—V of FIG. 4.

Referring to FIGS. 3 and 5, a rotary control valve 20 employing the fluid flow distributor circuit 14 is described.

The rotary valve 20 includes a valve housing 21 having a circular opening 21a which receives a valve sleeve 22 connected to a pinion which is adapted to engage a steering gear rack that in turn is connected to the steering gear linkages for the dirigible wheels of the vehicle. Positioned in the valve sleeve 22 is an inner valve 23. The inner valve 23 has a central opening which receives a torsion bar 24 having the top end pinned to a shaft portion of the inner valve 23. The bottom end of the torsion bar 24, as viewed in FIG. 3, is connected to the pinion.

Referring to FIGS. 3 and 5, in this rotary valve 20 three sets of such flow distributor circuits 13a, 13b and 13c are formed in angularly spaced relationship. Each of the distributor circuit includes two longitudinally extending inner grooves $D_1$ and $D_2$, shown in broken lines, formed in the cylindrical inner wall of the valve sleeve 23. These inner grooves $D_1$ and $D_2$ are angularly spaced and separated by a land. Between these inner grooves $D_1$ and $D_2$ is formed a radial opening $M_4$ which communicates with an outer circumferential groove $N_4$ which in turn communicates with a pump 10 (see FIG. 3). Drilled through the valve sleeve 23 are a pair of openings $M_3$ and $M_5$ axially spaced from the the opening $M_4$. These radial openings $M_3$ and $M_5$ communicate with the inner grooves $D_2$ and $D_1$, respectively. The radial opening $M_5$ communicates with a circumferential groove $N_5$ which in turn communicates with a right cylinder chamber 12R of a power cylinder 12 (see FIG. 1 also), while the other radial opening $M_3$ of the pair communicates with a circumferential groove $N_3$ which in turn communicates with a left cylinder chamber 12L of the power cylinder 12. Formed in the outer peripheral wall of the inner sleve 22 is a longitudinally extending main groove $E_3$ which lies opposite to the land between the main grooves $D_2$ and $D_1$ and communicates with the radial opening $M_4$ which in turn communicates with the pump 10. In the central rest position as illustrated in FIG. 5, the main groove $E_3$ overlaps the adjacent two inner grooves $D_2$ and $D_1$. Formed also in the inner wall of the valve sleeve 22 are a set of relatively short connection inner grooves $D_4$ and $D_3$. The grooves $D_4$ and $D_5$ are spaced away from each other in such a manner as to interpose theebetween the main grooves $D_2$ and $D_1$ and separated from the adjacent ones of them by lands. Lying opposite to the land between the inner grooves $D_2$ and $D_4$ and the land between the inner grooves $D_1$ and $D_3$ are relatively short longitudinally extending connection main grooves $E_4$ and $E_2$, respectively. One groove $E_4$ of them overlaps the adjacent two inner grooves $D_2$ and $D_4$, while the other groove $E_2$ overlaps the adjacent two inner grooves $D_1$. Formed also in the outer peripheral wall of the inner valve 23 are a set of relatively short longitudinally extending main grooves $E_5$ and $E_1$ which are circumferentially spaced from the adjacent grooves $E_4$ and $E_2$, respectively, and overlaps the adjacent inner grooves $D_4$ and $D_3$, respectively. Drilled through the inner valve 23 are a set of radial openings $Q_2$ and $Q_1$ which extend from the grooves $E_5$ and $E_1$ inwardly to the center axial bore receiving the torsional shaft 24. This center axial bore is communicates with a fluid resevoir 11 via a radial passage $Q_3$ drilled through the valve sleeve 23. Thus, the grooves $E_5$ and $E_1$ communicate with the fluid reservoir 11 and serve as drain grooves. From the preceding description, it will be understood that unrestricted fluid flow is provided between the groove main groove $E_3$ and the drain grooves $E_5$ and $E_1$.

It will now be explained how the variable flow orifices 1R, 1L, 2R and 2L are formed during the relative displacement of the inner valve 23 with regard to the valve sleeve 22. For each of the distributor circuit, the varibel flow orifice 1R is formed between the mating edges of the grooves $E_3$ and $D_1$, the variable flow orifice 1L is formed between the mating edges of the grooves $E_3$ and $D_2$, the variable flow orifice 2R is formed between the mating edges of the grooves $D_2$ and $E_4$, and 2L is formed between the mating edges of the grooves $D_1$ and $E_2$. Furthermore, the variable flow orifice 4R is formed between the mating edges of the grooves $D_4$ and $E_5$, and the variable flow orifice 4L is formed between the mating edges of the grooves $D_3$ and $E_1$.

Referring particularly to FIG. 3, the circumferential groove $N_4$ which is always supplied with hydraulic fluid from the pump 10 communicates with a passage 50 which in turn communicates with a stepped bore 52 at an increased diameter bore section thereof. The stepped bore 52 is formed in the housing 21 and blinded at on end. Slidably received in a reduced diameter section of the stepped bore 52 is a spool 27 of a spool type solenoid operated valve 25. The spool 27 is biased by a spring 54 against a plunger 26a of an actuator 26 including a solenoid 26b to assume a spring set position as illustrated in FIG. 3. The actuator 26 is mounted to a hub 56 which sealably closes end of the increased diameter section of the stepper bore 52 to define a chamber 58. To provide fluid communication between this chamber and a chamber accommodating the spring 54, an axial passage 58 is formed through the spool 27. Three annular grooves $J_{B2}$, $J_{A2}$ and $J_{A1}$ are formed in the wall of the reeuced diameter bore section. Two peripheral grooves $H_B$ and $H_A$ and a shoulder $H_C$ are formed on the outer peripheral wall of the spool 27. The groove $H_A$ communicates with the axial passage 58 and thus receive hydraulic fluid from the pump 10. When electric current is supplied to the solenoid 26b, the plunger of the actuator 26 presses the spool 27 against the spring 54 to cause it to displace toward the spring 54 in accordance with the amount of electric current. During this movement of the spool 27, the groove $H_B$ starts overlapping the circumferential groove $J_{B2}$ initially and after the spool $H_B$ has moved a distance, the shoulder $H_C$ and groove $H_A$ starts overlapping the circumferential grooves $J_{A1}$ and $J_{A2}$ simultaneously. When they starts overlapping the associated circumferential grooves, fluid communication between two passages 60 and 62 is allowed, and fluid flow from the passage 50 to a passage 64 via the shoulder $H_C$ and the circumferential groove $J_{A1}$ and fluid flow from the passage 50 to a passage 66 via the axial passage 58, the groove $H_A$ and the circumferential groove $J_{A2}$ is allowed. Thus, the shoulder $H_C$ and the circumferential groove $J_{A1}$ cooperate with each other to form a variable flow orifice valve 5A, the groove $H_A$ and the circumferential groove $J_{A2}$ cooperate with each other to form a variable flow orifice valve 5B, and the groove $H_B$ and the circumferential groove $J_{B2}$ cooperate with each other to form a variable flow orifice valve 6. Since the amount of electric current supplied to the solenoid 26b is varied in response to a vehicle speed V, the relationships as illustrated in FIGS. 2(e) and 2(f) are obtained.

Referring again to FIG. 5, a radial opening $M_2$ is drilled through the land of the valve sleeve 23 separating the inner grooves $D_2$ and $D_4$, and another radial opening $M_1$ is drilled through the land of the valve sleeve 23 separating the inner grooves $D_1$ and $D_3$. The radial openings $M_2$ and $M_1$ communicate with the grooves $E_4$ and $E_2$, respectively, and they communicate also with outer circumferential grooves $N_2$ and $N_1$ (see FIG. 3) which in turn communicate with the passages 60 and 62, respectively. It will now be understood that the fluid flow communication between the grooves $E_4$ and $E_2$ is allowed via the variable flow orifice valve 6.

As shown in FIG. 5, a set of relatively short longitudinally extending inner grooves $D_6$ and $D_5$ are formed in the inner cylindrical wall of the valve sleeve 22. The inner grooves $D_6$ and $D_5$ are spaced from the inner grooves $D_2$ and $D_1$, respectively, in such a manner as to interpose therebetween these inner grooves as viewed in FIG. 5, and separated by lands. A set of relatively short grooves $E_7$ and $E_6$ are formed in the outer peripheral wall of the inner valve 23. The groove $E_7$ lies opposite to the land separating the inner grooves $D_6$ and $D_2$ and overlaps the inner grooves $D_6$ and $D_2$, while the other groove $E_6$ lies opposite to the land separating the inner grooves $D_5$ and $D_1$ and overlaps the inner grooves $D_5$ and $D_1$. Drilled through the land of the valve sleeve 22 separating the inner grooves $D_6$ and $D_2$ is a radial opening $M_6$ which communicates with the inner groove $D_6$ on one hand and communicates with an outer circumferential groove $N_6$ on the other hand which in turn communicates with the passage 66 (see FIG. 3 also). Drilled through the land separating the inner grooves Dhly and $D_5$ is a radial opening $M_7$ which communicates with the inner groove $D_5$ on one hand and communicates with an outer circumferential groove $N_7$ on the other hand which in turn communicates with the passage 64. Since, as described above, the passages 64 and 66 are connected to the passage 50 communicating with the pump 10 via the variable flow orifice valves 5A and 5B, respectively, there is provided parallel flow of fluid from the pump 10 to the inner grooves $D_6$ and $D_7$ via the outer circumferential groove $N_4$ when the orifice valves 5A and 5B are opened. During relative displacement of the inner valve 23 with regard to the valve sleve 22, a variable flow orifice 3R is formed between the mating edges of the grooves $D_5$ and $E_6$, and a variable flow orifices 3L is formed between the mating edges of the grooves $D_6$ and $E_7$.

Referring to FIGS. 3 and 5 as well as FIG. 1, FIGS. 3 and 5 illustrate the position of parts when the rotary valve 20 is in the central rest position during operation at zero vehicle speed. Under this condition, all of the externally controlled variable flow orifice valves 5A, 5B and 6 are fully closed, fluid under pressure from the pump 10 is divided evenly through the variable flow orifices 1R, 2L and 4L in one direction and through the variable flow orifices 1L, 2R and 4R in the opposite direction. The pressure drops at the level of flow restrictions provided by these orifices are, under this condition, substantially nil. The rotary valve 20 thus has no effect on the power cylinder 12 and thus no effect on the steering system.

In the central rest position, assuming that all of the externally controlled variable flow orifice valves 5A, 5B and 6 are fully opened to provide the maximum orifice area thereof during operation of the vehicle at high speeds (see FIGS. 2(e) and 2(f)), fluid under pressure reaching the outer circumferential groove $N_4$ of the valve sleeve 22 is divided into two flows, one directed toward the groove $E_3$ via the radial opeing $M_4$, the other directed toward the increased diameter section of the stepped bore 52. The fluid under pressure having reached the groove $M_4$ is divided evenly through variable flow orifices 1R, 2L and 4L in one direction and through the variable flow orifices 1L, 2R and 4R in the opposite direction. The fluid under pressure having reached the increased diameter section of the stepped bore 52 is divided evenly through the externally controlled variable flow orifice area 5A, passage 64, variable flow orifices 3R, 2L and 4L in one direction and through the externally controlled variable flow orifice 5B, passage 66, variable flow orifice 3L, 2R and 4R in the opposite direction. It will be appreciated that the fluid under pressure divided at the outer circumferential groove $N_4$ join at the inner grooves $D_2$ and $D_1$ which communicate with the cylinder chambers 12R and 12L of the power cylinder 12, respectively. The rotary valve 20 has, under this condition, no effect on the power cylinder 12 and thus no effect on the steering system.

Figure 6:
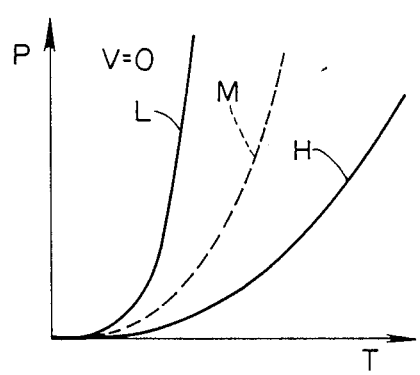
FIG. 6 is a chart showing power assist vs., steering torque characteristic curves for low vehicle and high vehicle speed.

In turning the steering wheel 15 at zero or substantially zero vehicle speeds where the variable flow orifice valves 5A, 5B and 6 are fully closed, there is accordingly a relative displacement of the inner valve 23 with respect to the valve sleeve 22. In the case of a displacement of the inner valve 23 in a clockwise direction, e.g., towards the top in FIG. 3, the variable flow orifices 1R, 2R and 4R effect a throttling of the fluid path inducing a pressure drop which in turn results in a pressure increase in the right cylinder chamber 12R of the power cylinder 12. The variable flow orifices 2L and 4L open simultaneously proportionally and thus the left cylinder chamber 12L is in substantially in direct communication with the fluid reservoir 11. Thus, there is created between the right and left cylinder chambers 12R and 12L a pressure differential causing the rod of the power cylinder 12 to displace towards the left in FIG. 6. The variable flow orifice 3R effects a throttling of the fluid path simultaneously, but since the orifice valve 5A is closed when the vehicle speed is zero or substantially zero, this throttling effected by the variable flow orifice 3R has no effect on the creation of the pressure differential. The hydraulic pressure P applied to the right power cylinder chamber 12R (i.e., a power assist) against the displacement of the inner valve 23 (i.e., a steering torque T) at zero vehicle speed (V=0) is illustrated by a characteristic curve L in FIG. 6.

Let us now consider how the rotary valve 20 works during operation at high vehicle speeds. Under this condition, all of the variable flow orifice valves 5A, 5B and 6 are fully opened. If the steering wheel 15 is turned clockwise during operation, there is accordingly a displacement of the inner valve 23 in a clockwise direction, e.g., towards the top in FIG. 5, the variable flow orifices 1R, 2R, 4R and 3R reduce their orifice areas against variation of steering torque. Since there is fluid passing through the orifice valve 6 bypassing the variable flow orifice 4R and at the same time there is fluid passing through the the orifice valve 5A, only three of them, namely 1R, 3R and 2R effect a throttling of fluid path inducing a less pressure drop which in turn results in a less pressure increase in the right cylinder chamber 12R of the power cylinder 12. The variable flow orifices 2L and 4L open simultaneously proportionally and thus the left cylinder chamber 12L is substantially in direct communication with the fluid reservoir 11. The variation of fluid pressure (P) in one of the cylinder chambers 12R and 12L, namely, a power assist, against steering torque (T) is illustrated by a fully drawn curve H in FIG. 6.

In turning the steering wheel 15 during operation of the vehicle at medium speeds where the orifice valves 5A and 5B are fully closed even though the orifice valve 6 remains fully opened, the variable flow orifices 1R and 2R effect a throttling of fluid path inducing a medium pressure drop which results in a medium pressure increase in the right cylinder chamber 12R of the power cylinder 12. As will be understood from comparison of FIG. 2(b) with FIG. 2(a), variation of pressure in the right cylinder chamber 12R reflects variation characteristic of orifice area of the variable flow orifice 2R.

Figure 7:
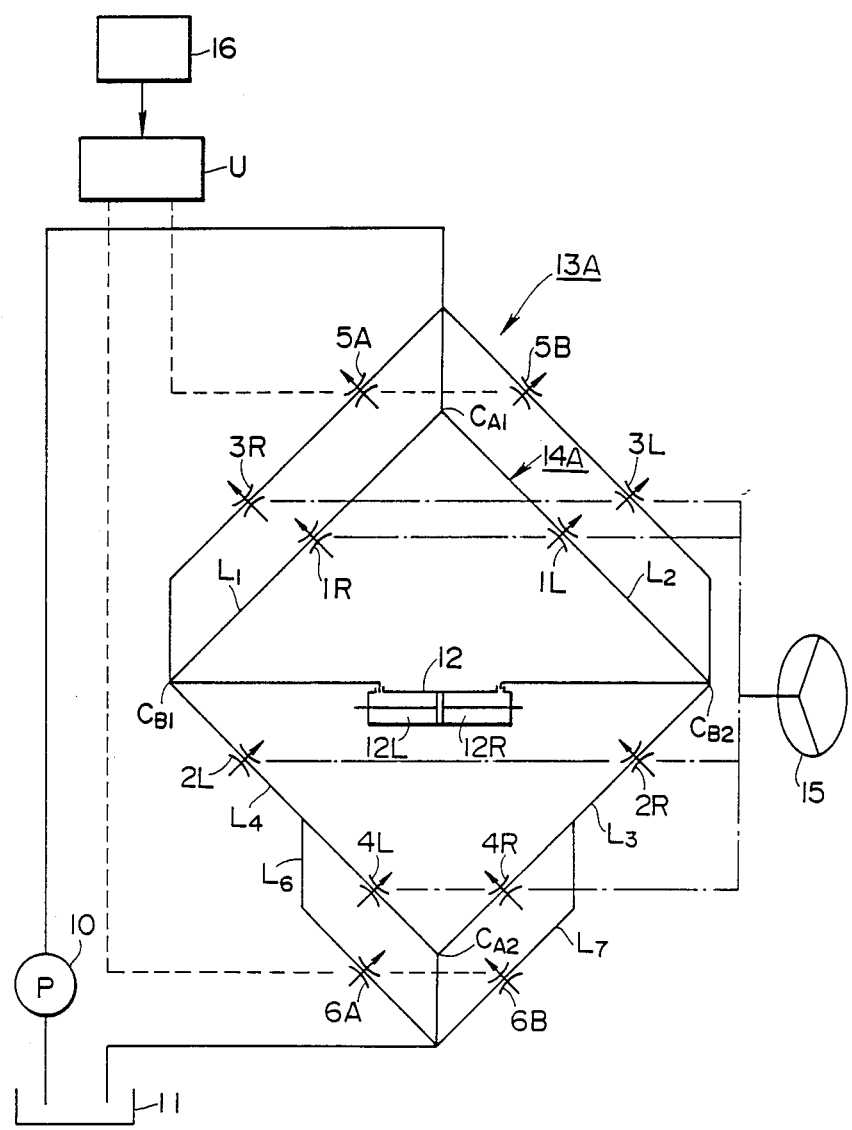
FIGS. 7 to 11 show various embodiments.
Figure 8:
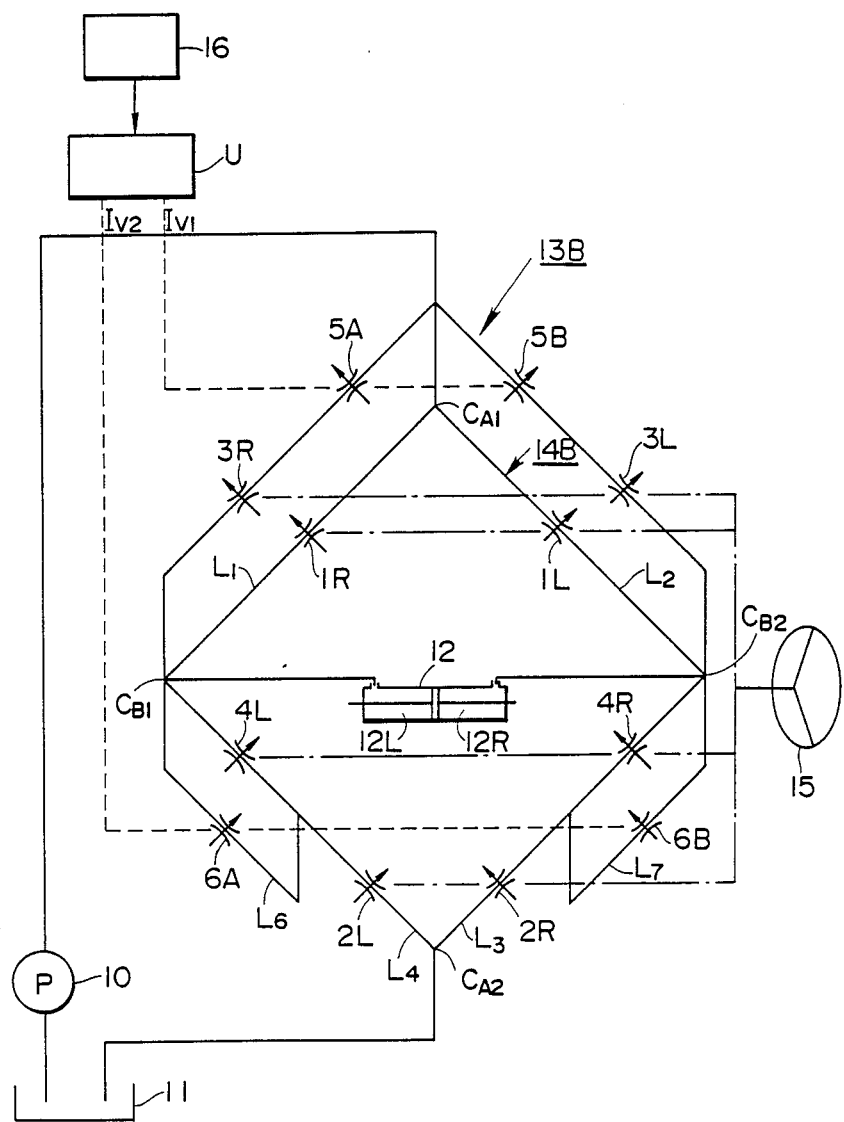
Figure 9:
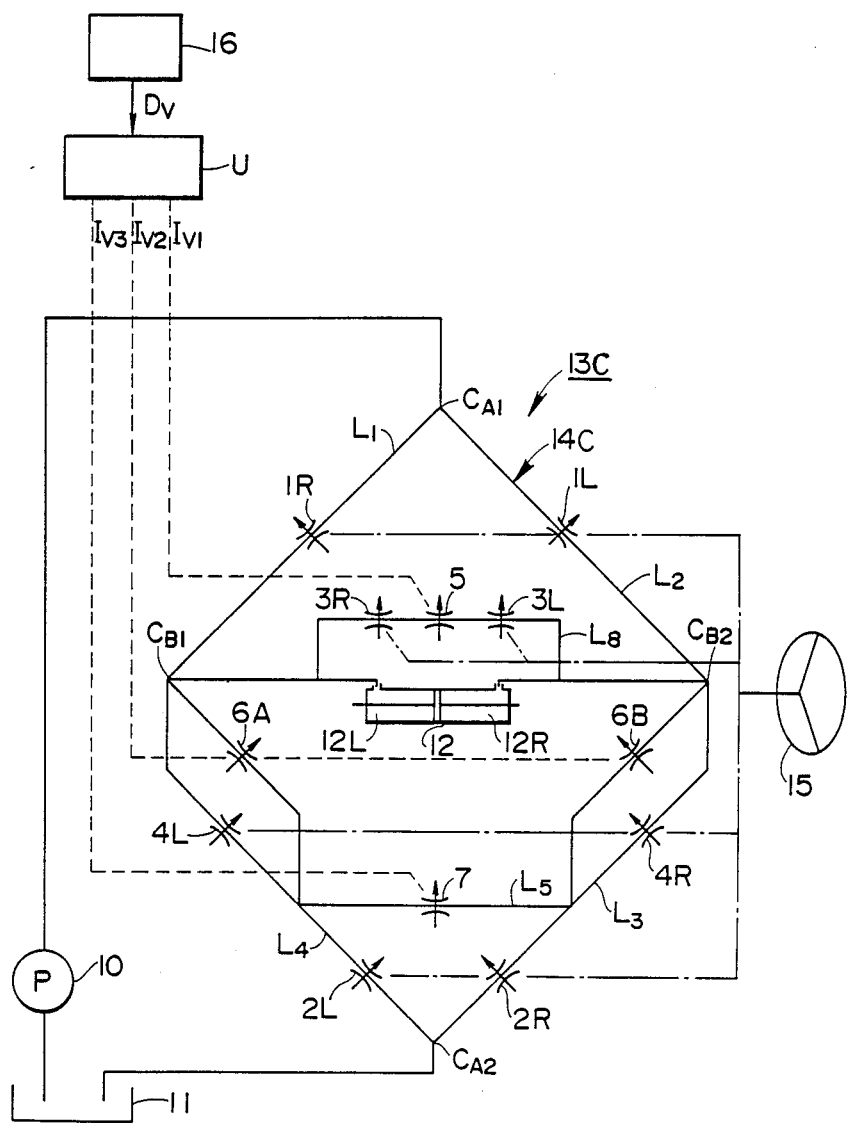

Although, in the embodiment shown in FIG. 1, the single bypass path $L_5$ with the externally controlled variable orifice valve 6 is used to modulate the characteristics of the downstream flow path portions $L_3$ and $L_4$, the same modulation can be effected by arranging two bypass paths $L_6$ and $L_7$, which are provided with externally controlled variable flow orifice valves 6A and 6B, respectively, in parallel to variable flow orifices 4L and 4R, respectively as shown in FIG. 7. Alternatively, the order of arrangement of variable orifices in the downstream flow path portions $L_3$ and $L_4$ may be reversed as shown in FIG. 8.

Figure 2G:
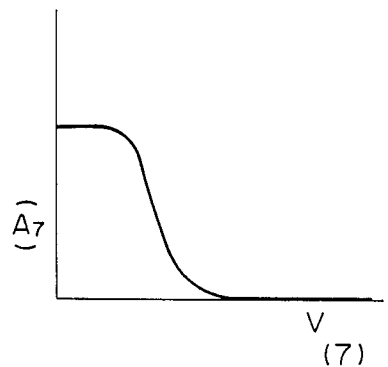
Figure 4:
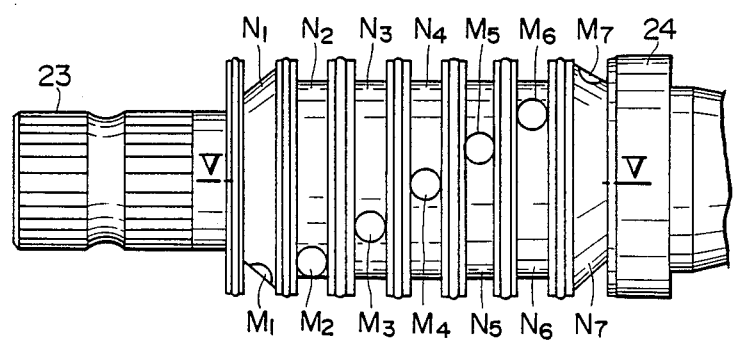
FIG. 4 is a perspective view of a valve sleeve with an inner valve.

Referring to FIG. 3, another embodiment of a control valve 13C using a fluid distributor circuit 14C is described. In this embodiment, in order to modulate upstream fluid path portions $L_1$ and $L_2$, a single fluid path $L_8$ has one end connected to a cylinder connection port $C_{B2}$ and an opposite end connected to a cylinder connection port $C_{B1}$. The bypass path $L_8$ is provided with variable flow orifices 3R and 3L which has orifice areas variable in response to steering torque as shown in FIG. 2(c), and an externally controlled variable flow orifice valve 5 having an orifice area ($A_5$) variable in response to vehicle speed (V) as shown in FIG. 2(e). In order to modulate downstream flow path portions $L_3$ and $L_4$, two bypass paths $L_6$ and $L_7$ are arranged in series with variable flow orifices 4L and 4R which are disposed upstream of the associated variable orifices 2L and 2R, respectively, and a bypass path $L_5$ has one end connected to the path $L_4$ at an intermediate point between the variable flow orifices 4L and 2L and an opposite end connected to the path $L_3$ at an intermediate point between the variable flow orifices 4R and 2R. Provided in this bypass path $L_5$ is an externally controlled variable flow orifice valve 7 which has an orifice area ($A_7$) variable in response to vehicle speed (V) as shown in FIG. 2(g).

Briefly explaining the operation of this control valve 13C, since, at zero or low vehicle speeds, the orifice valves 5, 6A and 6B are fully closed, but the orifice valve 7 is fully opened as shown in FIG. 2e and 2(f), thus substantially the same valve characteristic as the first embodiment shown in FIG. 1 is provided except that the variable orifice 2R or 2L is bypassed by the bypass path $L_5$. At high vehicle speeds, the orifice valves 5, 6A and 6B are fully opened, but the orifice valve 7 is fully closed, so that the variable orifice 4R (or 4L) is bypassed and the bypass path $L_8$ is arranged in parallel with the variable flow orifice 1R with regard to the power cylinder 12. Thus, this fluid flow arrangement provides ubstantially the same valve characteristic as those of the first embodiment. At medium vehicle speeds, all of the orifice valves except the orifice valves 6A and 6B are closed, thus providing the same valve characteristic as those of the first embodiment.

In the previously described examples, vehicle speed V is detected and used as a variable on which the control unit U controls electric current passing through the solenoid operated actuator for the externally controlled variable flow orifice valves.

If desired, the externally controlled orifice valves may be controlled in response to some other variable related to a driver's preference or mode of operation of the vehicle.

Figure 10:
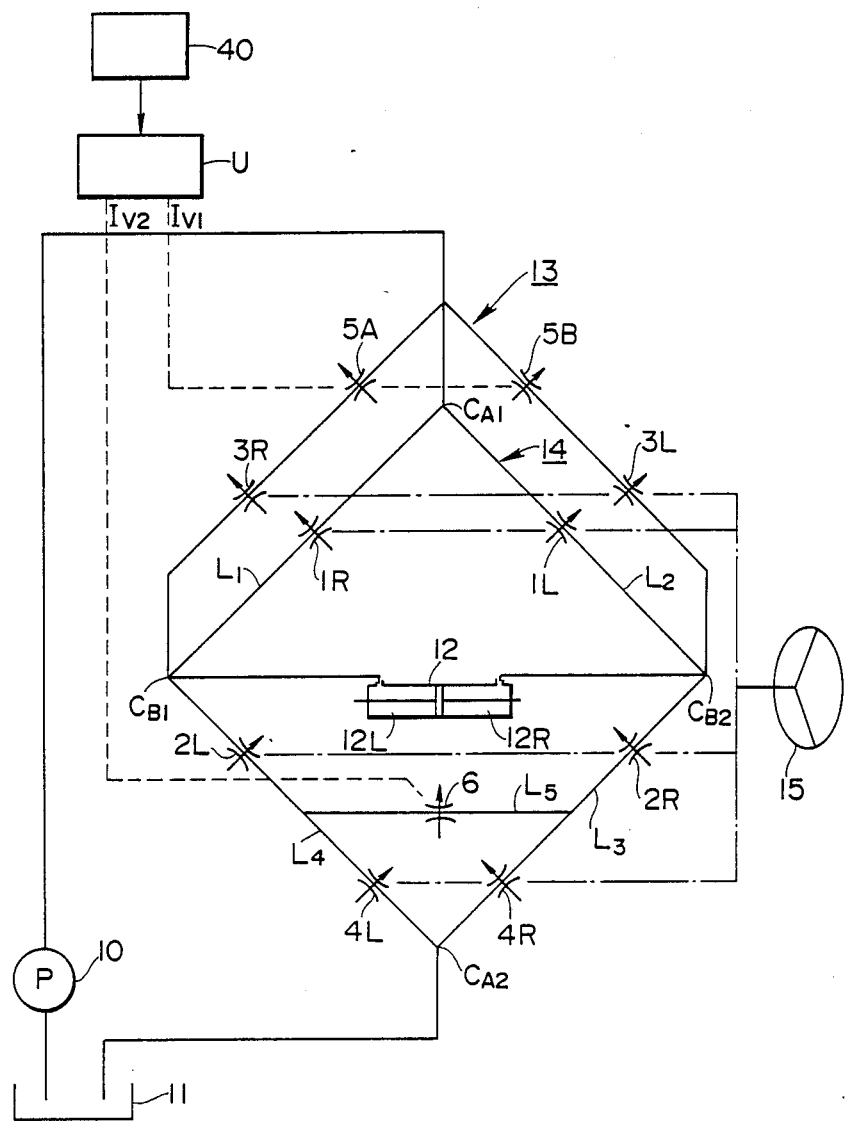

Referring to FIG. 10, a control unit U is supplied with the output of a manually operable selector 40 as different from the output of the vehicle speed sensor 16. The manually operable selctor 100 includes a variable resistor and a rotary type switch arranged near the vehicle's driver. With the manual selector 40, the driver can vary electric current passing through a solenoid actuator for externally controlled variable flow orifices 4A and 4B so that the level of power assist can be adjusted until it fits the driver's preference.

Figure 11:
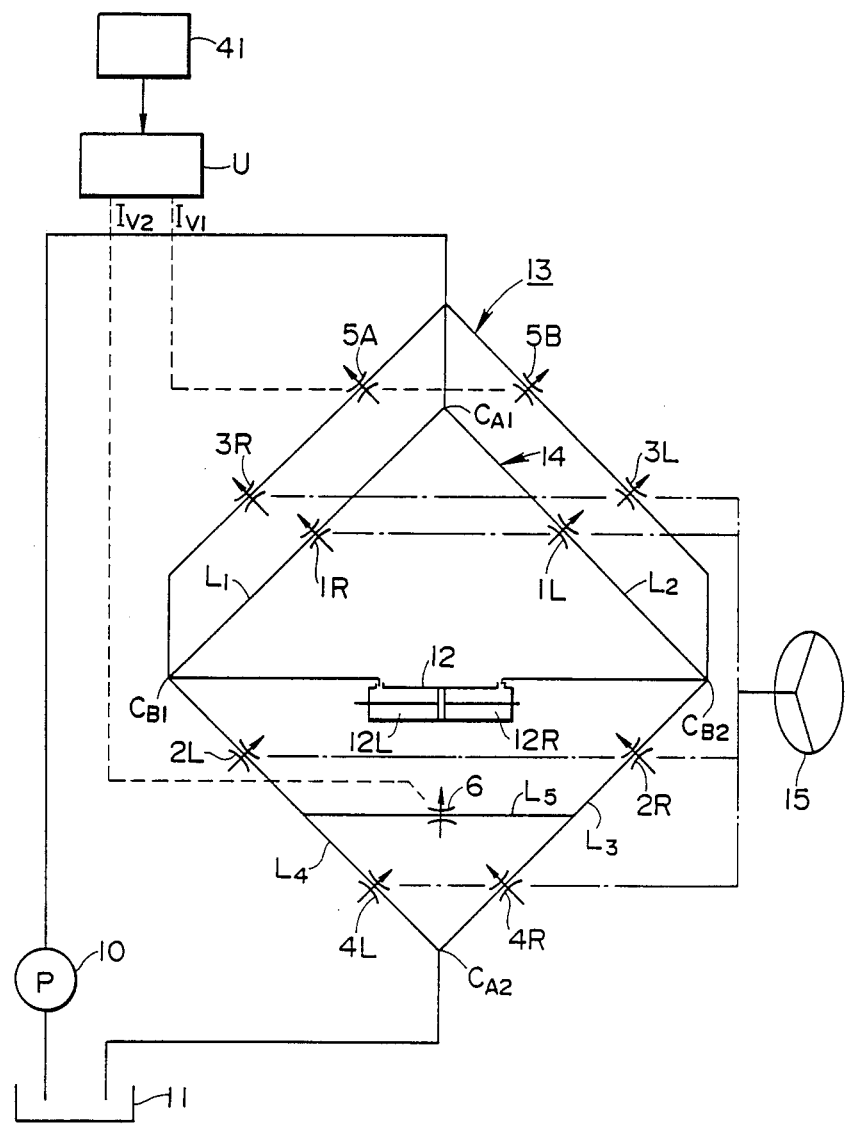

Referring to FIG. 11, a control unit U is supplied with the output of a road friction coefficient sensor 41. The control unit U can vary electric current passing through the solenoid actuator in accordance with friction coefficient detected by the sensor 41 such that the level of power assist vary in response to the friction coefficient detected by the sensor 41. One example of such a sensor is a switch coupled to a vehicle's wiper switch. In this case, the solenoid current increases as wiper speed increases, thus decreasing the level of power assist in response to wiper speed. This is advantageous because it is the common behaviour of a vehicle' driver to increase the wiper speed as rain fall gets heavier. A rain drop sensor may be used as a road friction coefficient sensor. It is possioble to detect road friction coefficient by computing a difference in rotation between a traction road wheel and a non-traction road wheel or directly detect road friction coefficient by detecting the amount of splash by a traction road wheel. In using the above-mentioned sensors to detect road friction coefficient, it is also possible to modify solenoid current that is determined based on vehicle speed in response to the friction coefficient detected.

The solenoid current may be varied to modify the orifice area vs., vehicle speed characteristics shown in FIGS. 2(e) to 2(g) in response to frequency of acceleration and deceleration which the vehicle is subject to. The solenoid current may be varied in accordance with judgement made based on steering wheel angle and speed at which the steering wheel is turned. Lastly, the solenoid current may be varied in response to load imposed on the vehicle drigible road wheels. If desired, the externally controlled variable flow orifice valves are controlled in response to different variables or control factors.

What is claimed is:

1. A variable assist power steering system for vehicles including a hydraulic fluid source, a fluid reservoir, and a hydraulic pressure operated power cylinder adapted to be connected to a steering linkage, comprising:

a control valve including valve elements relatively displaceable in response to a first predetermined variable to define therebetween two parallel fluid flow paths connected between the fluid source and the fluid reservoir to produce a pressure difference in the power cylinder in response to said first predetermined variable, wherein said control valve comprises a bypass path provided with a first variable flow orifice that has an orifice area variable in response to said first predetermined variable and a first externally controlled variable flow orifice valve that has an orifice area variable in response to a second predetermined variable which is different from said first predetermined variable, said first externally controlled variable flow orifice valve being arranged in series with said first variable flow orifice;

said bypass path is arranged in parallel to a portion of the parallel fluid flow paths;

said control valve also comprises a second externally controlled variable flow orifice valve that has an orifice area variable in response to a third predetermined variable which is different from said first predetermined variable and a second variable flow orifice that has an orifice area variable in response to said first predetermined variable;

said second externally controlled variable flow orifice valve is arranged in parallel to another portion of the parallel fluid flow paths; and said second variable flow orifice is arranged in series with said second externally controlled variable flow orifice valve and in the remaining portion of the parallel fluid flow paths.

2. A variable assist power steering system as claimed in claim 1, wherein said third predetermined variable is equal to said second predetermined variable.

3. A variable assist power steering system as claimed in claim 1, wherein said control valve includes a third externally controlled variable flow orifice valve arranged in parallel with said second variable flow orifice, and in series with said second externally controlled variable flow orifice valve.

4. A variable assist power steering system as claimed in claim 1, wherein said predetermined variable is a steering torque.

5. A variable assist power steering system as claimed in claim 2, wherein said bypass path has one end connected the power cylinder and an opposite end connected to one of the fluid source and the fluid reservoir.

6. A variable assist power steering system as claimed in claim 5, wherein said bypass path is arranged in parallel with a portion of each of said two parallel fluid flow paths.

7. A variable assist power steering system as claimed in claim 1, wherein said bypass path is arranged in parallel to the power cylinder.

8. A variable assist power steering system as claimed in claim 1, wherein said predetermined variable is a steering input torque and said second predetermined variable is vehicle speed.

9. A variable assist power steering system as claimed in claim 1, wherein said control valve comprises as said relatively displaceable valve elements an inner valve and a valve sleeve with a bore receiving said inner valve.

10. A variable assist power steering system as claimed in claim 9, wherein said valve sleeve has an inner wall formed with two first longitudinally extending inner grooves separated by a land, said inner grooves being connected to the power cylinder, said inner wall is formed with two second inner grooves spaced from each other in such a manner as to interpose therebetween said first inner grooves, and also with two third inner grooves, each being connected via said first externally controlled variable flow orifice valve to the fluid source.

11. A variable assist power steering system for vehicles including a hydraulic fluid source, a fluid reservoir, and a hydraulic pressure operated power cylinder adapted to be connected to a steering linkage, comprising:

a control valve including valve elements relatively displaceable in response to a first predetermined variable to define therebetween two parallel fluid flow paths connected between the fluid source and the fluid reservoir to produce a pressure difference in the power cylinder in response to said first predetermined variable;

wherein said valve elements define a first pair of main variable flow orifices, one disposed in one of said two parallel fluid flow paths at an upstream portion between the hydraulic fluid source and the power cylinder and the other in the other of said two parallel fluid flow paths at a downstream portion between the power cylinder and the fluid reservoir, and said valve elements define also a second pair of main variable flow orifices, one disposed in said other of said two parallel fluid flow paths at an upstream portion between the hydraulic fluid source and the power cylinder and the other in said one of said two parallel fluid flow paths at a downstream portion between the power cylinder and the fluid reservoir, said first pair of main variable flow orifices having orifice areas which are decreased as said valve elements relatively displace in one direction, said second pair of main variable flow orifices having orifice areas which are decreased as said valve elements relatively displace in the opposite direction;

wherein said control valve comprises two first bypass paths connected in parallel to said upstream portions of said two parallel fluid flow paths, respectively, each of said two first bypass paths including a first auxiliary variable flow orifice that has an orifice area variable flow orifice that has an orifice area variable in response to said first predetermined variable and a first externally controlled variable flow orifice valve connected in series with said first auxiliary variable flow orifice, each of said first externally controlled variable flow orifice valves having an orifice area variable in response to a second predetermined variable which is different from said first predetermined variable;

wherein said valve elements define two second auxiliary variable flow orifices disposed in said downstream portions of said two parallel fluid flow paths, respectively, and connected in series with said main variable flow orifices disposed in said downstream portions, respectively, each of said second auxiliary variable flow orifices having an orifice area variable in response to said first predetermined variable;

wherein said control valve also comprises a second bypass path connected in series with said two second variable flow orifices and in parallel to at least one of said main variable flow orifices of said downstream portions of said two parallel fluid flow paths, said second bypass path including a second externally controlled variable flow orifice valve that has an orifice area variable in response to a third predetermined variable which is different from said first predetermined variable.

12. A variable assist power steering system for vehicles including a hydraulic fluid source, a fluid reservoir, and a hydraulic pressure operated power cylinder adapted to be connected to a steering linkage, comprising:

a control valve including valve elements relatively displaceable in response to a first predetermined variable to define therebetween two parallel fluid flow paths connected between the fluid source and the fluid reservoir to produce a pressure difference in the power cylinder in response to said first predetermined variable;

wherein said valve elements define a first pair of main variable flow orifices, one disposed in one of said two parallel fluid flow paths at an upstream portion between the hydraulic fluid source and the power cylinder and the other in the other of said two parallel fluid flow paths at a downstream portion between the power cylinder and the fluid reservoir, and said valve elements define also a second pair of main variable flow orifices, one disposed in said other of said two parallel fluid flow paths at an upstream portion between the hydraulic fluid source and the power cylinder and the other in said one of said two parallel fluid flow paths at a downstream portion between the power cylinder and the fluid reservoir, said first pair of main variable flow orifices having orifice areas which are decreased as said valve elements relatively displace in one direction, said second pair of main variable flow orifices having orifice areas which are decreased as said valve elements relatively displace in the opposite direction;

wherein said control valve comprises two first bypass paths, each being connected in parallel to one of said upstream portions of said two parallel fluid flow paths, each of said first bypass paths including a first auxiliary variable flow orifice that has an orifice area variable in response to said first predetermined variable and a first externally controlled variable flow orifice valve connected in series with said first auxiliary variable flow orifice, said first externally controlled variable flow orifice valve having an orifice area variable in response to a second predetermined variable which is different from said first predetermined variable;

wherein said control valve also comprises two second bypass paths connected in parallel to said main variable flow orifices of said downstream portions, respectively, each of said two second bypass paths including a second externally controlled variable flow orifice valve that has an orifice area variable in response to a third predetermined variable which is different from said first predetermined variable; and wherein said valve elements define two second auxiliary variable flow orifices disposed in said downstream portions, respectively, and connected in series with said second bypass paths, respectively, each of said second auxiliary variable flow orifices having an orifice area variable in response to said first predetermined variable.

13. A variable assist power steering system for vehicles including a hydraulic fluid source, a fluid reservoir, and a hydraulic pressure operated power cylinder adapted to be connected to a steering linkage, comprising:

a control valve including valve elements relatively displaceable in response to a first predetermined variable to define therebetween two parallel fluid flow paths connected between the fluid source and the fluid reservoir to produce a pressure difference in the power cylinder in response to said first predetermined variable;

wherein said valve elements define a first pair of main variable flow orifices, one disposed in one of said two parallel fluid flow paths at an upstream portion between the hydraulic fluid source and the power cylinder and the other in the other of said two parallel fluid flow paths at a downstream portion between the power cylinder and the fluid reservoir, and said valve elements define also a second pair of main variable flow orifices, one disposed in said other of said two parallel fluid flow paths at an upstream portion between the hydraulic fluid source and the power cylinder and the other in said one of said two parallel fluid flow paths at a downstream portion between the power cylinder and the fluid reservoir, said first pair of main variable flow orifices having orifice areas which are decreased as said valve elements relatively displace in one direction, said second pair of main variable flow orifices having orifice areas which are decreased as said valve elements relatively displace in the opposite direction;

wherein said control valve comprises a first bypass path connected across the power cylinder, said first bypass path including two first auxiliary variable flow orifices, each having an orifice area variable in response to said first predetermined variable, and a first externally controlled variable flow orifice valve connected in series with said two first auxiliary variable flow orifices, said first externally controlled variable flow orifice valve having an orifice area variable in response to a second predetermined variable which is different from said first predetermined variable;

wherein said control valve also comprises a second bypass path connected in parallel to said main variable orifice of one of said downstream portions and including a second externally controlled variable flow orifice valve that has an orifice area variable in response to a third predetermined variable which is different from said first predetermined variable;

wherein said valve elements define two second auxiliary variable flow orifices disposed in said downstream portions, respectively, and connected in series with said second bypass path, respectively, each of said second auxiliary variable flow orifices having an orifice area variable in response to said first predetemined variable; and wherein said control valve also comprises two third bypass paths connected in parallel to said two auxiliary variable flow orifices, respectively, each of said two third bypass paths including a third externally controlled variable flow orifice valve which has an orifice variable in response to a third predetermined variable different from said first predetermined variable.

* * * * *